(12) United States Patent
Deluca et al.

(10) Patent No.: US 8,448,092 B2
(45) Date of Patent: May 21, 2013

(54) POSITIONAL EFFECTS IN A THREE-DIMENSIONAL DESKTOP ENVIRONMENT

(75) Inventors: Lisa Seacat Deluca, San Francisco, CA (US); Lydia M. Do, Research Triangle Park, NC (US); Pamela A. Nesbitt, Tampa, FL (US)

(73) Assignee: International Business Machines Corporation, Armonk, NY (US)

( * ) Notice: Subject to any disclaimer, the term of this patent is extended or adjusted under 35 U.S.C. 154(b) by 440 days.

(21) Appl. No.: 12/625,907

(22) Filed: Nov. 25, 2009

(65) Prior Publication Data

US 2011/0126161 A1 May 26, 2011

(51) Int. Cl.
*G06F 3/048* (2006.01)

(52) U.S. Cl.
USPC .......................... 715/850; 715/852

(58) Field of Classification Search
USPC .......................... 715/848, 850, 852
See application file for complete search history.

(56) References Cited

U.S. PATENT DOCUMENTS

| | | | | |
|---|---|---|---|---|
| 5,838,326 A * | 11/1998 | Card et al. | | 715/775 |
| 6,219,032 B1 | 4/2001 | Rosenberg et al. | | |
| 6,615,139 B1 | 9/2003 | Chakravarthi | | |
| 7,137,075 B2 * | 11/2006 | Hoshino et al. | | 715/848 |
| 7,665,033 B2 * | 2/2010 | Byrne et al. | | 715/782 |
| 7,735,018 B2 * | 6/2010 | Bakhash | | 715/782 |
| 7,752,565 B2 * | 7/2010 | Bombolowsky et al. | | 715/766 |
| 2002/0040362 A1 * | 4/2002 | Lewis | | 707/3 |
| 2007/0008332 A1 * | 1/2007 | Smith | | 345/581 |
| 2008/0168364 A1 * | 7/2008 | Miller et al. | | 715/762 |
| 2008/0313568 A1 * | 12/2008 | Park et al. | | 715/835 |

OTHER PUBLICATIONS

Watanbe, N., et al. "Bubble Clusters: An Interface for Manipulating Spatial Aggregation of Graphical Objects," UIST (2007), Newport, RI. pp. 173-182.

Mullen, P., et al. "A Variational Approach to Eulerian Geometry Processing," ACM Transactions on Graphics, vol. 26(3), Article 66, (Jul. 2007), 10pgs.

* cited by examiner

*Primary Examiner* — Omar Abdul-Ali
(74) *Attorney, Agent, or Firm* — Patterson & Sheridan, LLP

(57) ABSTRACT

Systems, methods and articles of manufacture are disclosed for arranging display elements in a three-dimensional desktop environment. In one embodiment, each display element may include an attribute. A user request may be received to apply the positional effect to the display elements. The positional effect may be applied to the display elements based on the attribute, responsive to the user request.

19 Claims, 4 Drawing Sheets

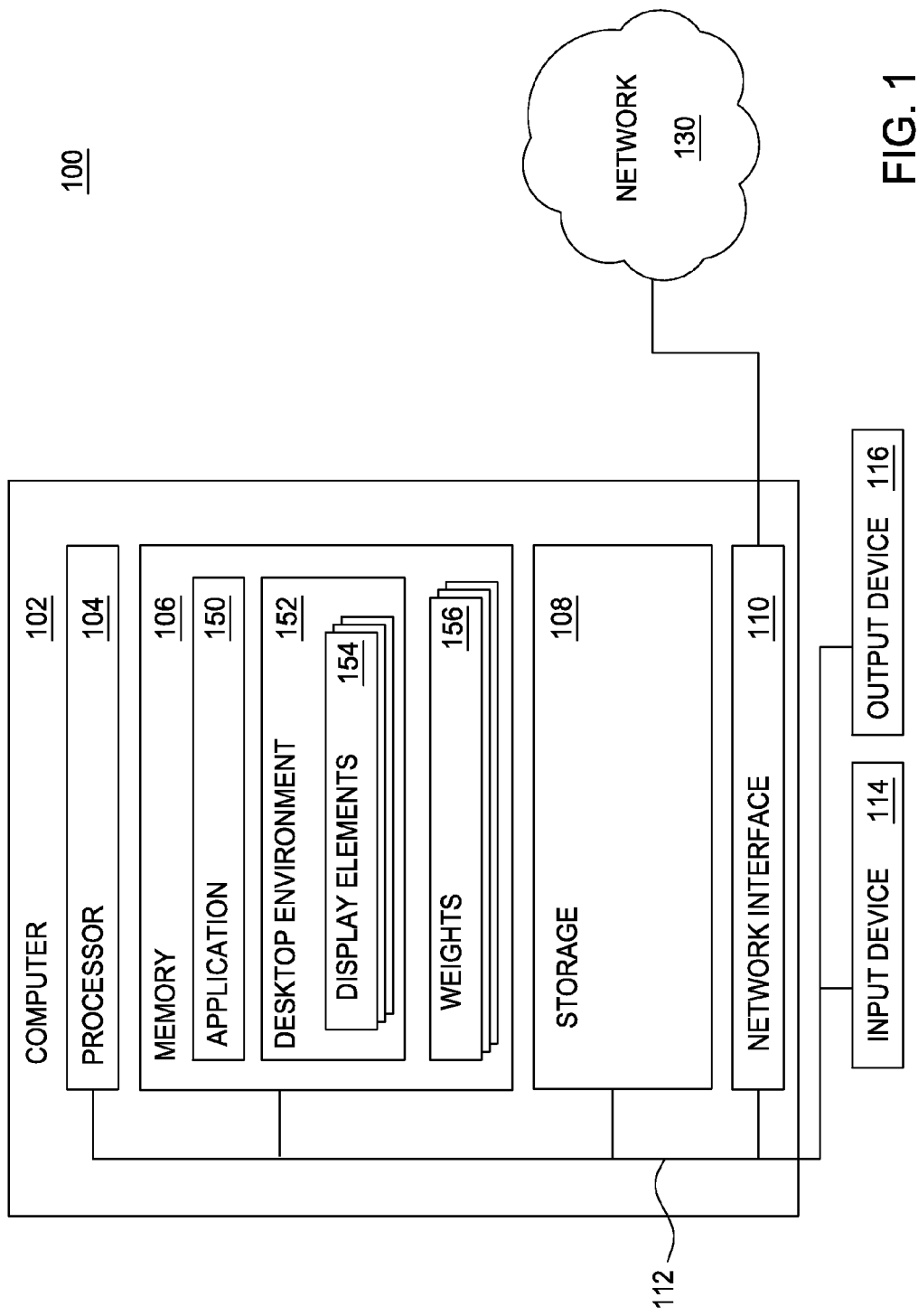

POSITIONAL EFFECTS IN A THREE-DIMENSIONAL DESKTOP ENVIRONMENT

BACKGROUND

1. Field of the Invention

Embodiments of the invention relate to the use of desktop environments on computer systems. More specifically, embodiments of the invention relate to techniques for applying a positional effect in a three-dimensional desktop environment.

2. Description of the Related Art

Many computer systems today provide a desktop environment for a user. A desktop environment generally refers to a style of graphical user interface (GUI) that is based on a metaphor of a physical desktop. The desktop environment may be provided by a window manager. A window manager generally refers to software that controls placement and appearance of windows within a windowing system in a graphical user interface. Window managers may be integrated into an operating system or may execute as a standalone application in an environment provided by the operating system. The desktop environment provides a user with convenient ways of accessing features of the operating system and/or the window manager. The features may typically include opening, closing, minimizing, maximizing, moving, resizing, and keeping track of windows. In context of user interfaces, a window generally refers to a visual area containing a user interface to the operating system or an executing application. Many window managers also provide additional features such as docking, task bars, program launchers, desktop icons, wallpaper, and the like.

As computer technology advances, computer systems may execute more applications simultaneously and store increasing numbers of files for the user. As a result, the desktop environment may include an increasing number of windows and icons.

SUMMARY

One embodiment of the invention includes a computer-implemented method. The method may generally include configuring one or more computer processors to perform an operation for arranging a plurality of display elements in a three-dimensional desktop environment. The operation itself may generally include receiving a user request to apply a positional effect to the plurality of display elements. Each display element (of the plurality of display elements) may include a respective attribute and each display element is disposed at an initial position in the three-dimensional desktop environment. In response to the received user request, the positional effect may be applied to each of the plurality of display elements by (i) determining, for each of the plurality of display elements, a final position based on said respective attribute and (ii) rendering an animation of each of the plurality of display elements moving from the respective initial position to the respective final position.

Another embodiment of the invention includes a computer-readable storage medium containing a program, which, when executed on a processor, performs an operation for arranging a plurality of display elements in a three-dimensional desktop environment. The operation itself may generally include receiving a user request to apply a positional effect to the plurality of display elements. Each display element (of the plurality of display elements) may include a respective attribute and each display element is disposed at an initial position in the three-dimensional desktop environment. In response to the received user request, the positional effect may be applied to each of the plurality of display elements by (i) determining, for each of the plurality of display elements, a final position based on said respective attribute and (ii) rendering an animation of each of the plurality of display elements moving from the respective initial position to the respective final position.

Still another embodiment of the invention includes a system having one or more computer processors and a memory containing a program, which when executed by the one or more computer processors performs an operation for arranging a plurality of display elements in a three-dimensional desktop environment. The operation itself may generally include receiving a user request to apply a positional effect to the plurality of display elements. Each display element (of the plurality of display elements) may include a respective attribute and each display element is disposed at an initial position in the three-dimensional desktop environment. In response to the received user request, the positional effect may be applied to each of the plurality of display elements by (i) determining, for each of the plurality of display elements, a final position based on said respective attribute and (ii) rendering an animation of each of the plurality of display elements moving from the respective initial position to the respective final position.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 1 is a block diagram illustrating a system for applying a positional effect to display elements of a three-dimensional desktop environment, according to one embodiment of the invention.

DETAILED DESCRIPTION OF THE PREFERRED EMBODIMENTS

Figure 2A:
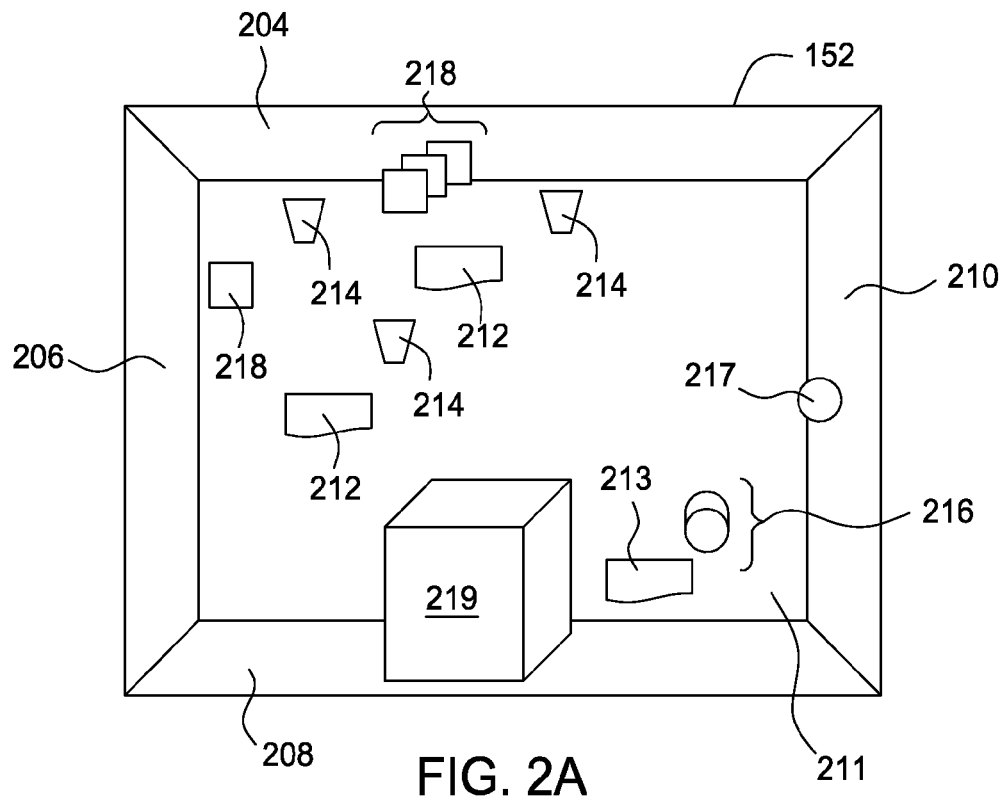
FIGS. 2A-2B illustrate the three-dimensional desktop environment, according to one embodiment of the invention.

Embodiments of the invention provide techniques for arranging elements displayed on three-dimensional desktop environment. As used herein, a display element may represent an object (such as a file, a folder, a shortcut, a printer, etc.) an executing application, or an icon used to launch the execution of an application. A display element may also represent a group of objects or a group of executing applications. One embodiment of the invention provides a window manager application (or simply, application). As described above, a window manager refers to software that controls placement and appearance of windows presented in a user interface display. The window manager may be integrated into an operating system or execute as a standalone application. In one embodiment, the application may receive user input specifying values for attributes of the display elements (e.g., icons). The application may receive a user request to apply a positional effect to the display elements. The application may apply the positional effect to the display elements. The positional effect may arrange the display elements in a fashion more convenient to the user. In this regard, the positional effect may in some cases behave like a gravitational effect on the display elements from a plane in the three-dimensional desktop environment. Consequently, the user may more effectively manage display elements in a three-dimensional desktop environment via the application.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a block diagram illustrating a system 100 for applying a positional effect to display elements of the three-dimensional desktop environment, according to one embodiment of the invention. The system 100 includes a computer 102. The computer 102 may be connected to other computers via a network 130. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system (not shown). Examples of operating systems include UNIX, versions of the Microsoft Windows® operating system, and distributions of the Linux® operating system. (Note: Linux is at trademark of Linus Torvalds in the United States and other countries.) More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single entity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers via the network 130.

The storage 108 may be a hard disk drive storage device. Although the storage 108 is shown as a single unit, the storage 108 may be a combination of fixed and/or removable storage devices, such as fixed disc drives, floppy disc drives, tape drives, removable memory cards, or optical storage. The memory 106 and the storage 108 may be part of one virtual address space spanning multiple primary and secondary storage devices.

The input device 114 may be any device for providing input to the computer 102. For example, a keyboard, keypad, light pen, touch-screen, track-ball, or speech recognition unit, audio/video player, and the like may be used. The output device 116 may be any device for providing output to a user of the computer 102. For example, the output device 116 may be any conventional display screen or set of speakers, along with their respective interface cards, i.e., video cards and sound cards. Although shown separately from the input device 114, the output device 116 and input device 114 may be combined. For example, a display screen with an integrated touch-screen, a display with an integrated keyboard, or a speech recognition unit combined with a text speech converter may be used.

As shown, the memory 106 of the computer 102 includes an application 150, a desktop environment 152, and weights 156. The desktop environment 152 includes display elements 154. The desktop environment 152 may be three-dimensional, according to one embodiment. As described above, a display element may provide an icon representing an object (such as a file, a folder, a shortcut, a printer, etc.) or an executing application. Similarly, a display element may be a window present on the desktop. As described above, the application 150 may be a window manager that provides the desktop environment 152. As further described below, the application applies a positional effect to arrange the display elements 154 in the desktop environment 152, according to one embodiment.

Figure 2B:
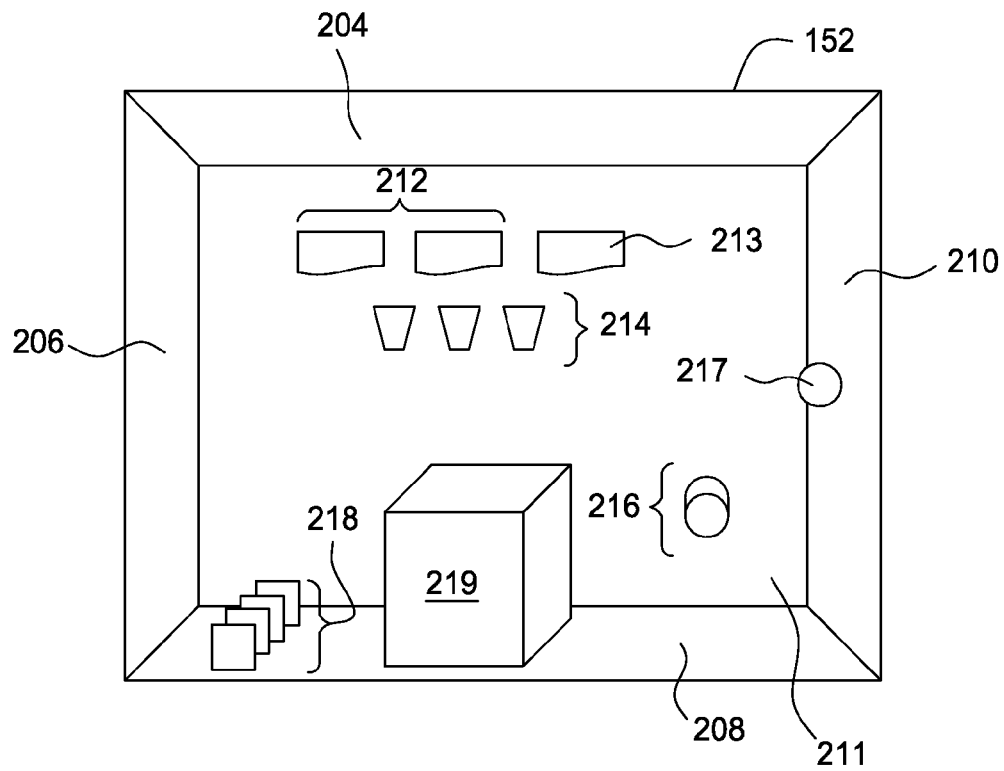

FIGS. 2A-2B illustrate the desktop environment 152 of FIG. 1, according to one embodiment of the invention. As shown in FIG. 2A, the desktop environment 152 is analogous to a cube having a front plane (not visible in FIG. 2A), a left plane 206, a right plane 210, a top plane 204, a bottom plane 208, and a back plane 211. Further, the desktop environment includes display elements 212, 213, 214, 216, 217, 218, 219.

Each display element may occupy a position in a three-dimensional space contained within the six planes of the desktop environment. Further, a user may rotate the three-dimensional desktop environment to access a distinct view of the three-dimensional desktop environment. For example, the user may change the current view (e.g., from a perspective of the front plane) to a new view (e.g., from a perspective of the top plane).

In one embodiment, the application 150 may receive user input specifying weights 156 to assign to the display elements 212, 213, 214, 216, 217, 218, 219. In one embodiment, each weight is selected from one of "Light," "Heavy," "Heavier," and "Heaviest." In response, the application 150 may assign the specified weights 156 to the display elements 212, 213, 214, 216, 217, 218, 219. Of course, one skilled in the art will recognize that how weights are assigned to the display elements may be tailored to suit the needs of a particular case. For example, in an alternative embodiment, each weight may be specified as a numerical value rather than as a string. More generally, embodiments of the invention may be adapted to support applying a positional effect to display elements of a desktop environment based on a variety of attributes of the display elements. For example, suppose a display element is an icon representing a file. The attribute of a display element could represent a size of the file as identified by the operating system.

Suppose that the user specifies a light weight for the display elements 212, 213. Further, the user specifies a heavy weight for the display elements 214. Further still, the user specifies a heavier weight for the display elements 216, 217. Still further, the user specifies a heaviest weight for the display elements 218, 219. The application 150 assigns the specified weights to each of the display elements 212, 213, 214, 216, 217, 218, 219.

In one embodiment, the application 150 receives a user request to apply a positional effect to the display elements 212, 213, 214, 216, 217, 218, 219. For example, the user may right-click the desktop environment 152 using a pointing device, such as a mouse or the user may input a keystroke, such as CTRL+G, to request to apply the positional effect.

In one embodiment, the application 150 applies the positional effect to the display elements 212, 213, 214, 216, 217, 218, 219 in response to the request. The application 150 may apply the positional effect with respect to a plane of the three-dimensional desktop environment. The plane may be specified by a user. For example, suppose that the positional effect is to be applied with respect to the bottom plane 208. For each distinct weight (i.e., of the display elements), the application 150 may determine a corresponding distance from the bottom plane 208 at which the display element is to be positioned (by the positional effect). The application 150 may then move each display element from a current position towards a new position that is located at the determined distance from the bottom plane 208.

Suppose that weights Light, Heavy, Heavier, and Heaviest are respectively associated with the distance values of 750 pixels, 600 pixels, 256 pixels, and 0 pixels. In such a case, the application 150 could interpret the distance values respectively as 750 pixels, 600 pixels, 256 pixels, and 0 pixels from the bottom plane 208. Alternatively, distance values may be given as a percentage of a distance from the bottom plane 208 to the top plane 204 (e.g., 75%, 60%, 25%, 0%).

In one embodiment, the application applies the positional effect to arrange the display elements in the three-dimensional desktop environment. The application 150 may move each display element 212, 213, 214, 216, 217, 218, 219 from an initial or current position to a final position. In this particular example, the application 150 renders an animation of the display element 213 being moved to a final position seven hundred and fifty pixels from the bottom plane 208. Further, the application 150 renders an animation of display element 214 moving to a final position 600 pixels from the bottom plane 208. Further still, the application 150 renders an animation moving display element 216 to a final position two hundred and fifty six pixels from the bottom plane 208. Still further, the application 150 renders an animation moving display elements 218, 219 to a final position zero pixels from the bottom plane 208. FIG. 2B illustrates the display elements 212, 213, 214, 216, 217, 218, 219 at the new positions in the three-dimensional desktop environment, according to one embodiment. Thus, the application 150 has applied the positional effect to arrange the display elements in the three-dimensional desktop environment. Further, display elements having the same weight may be arranged next to each other using other techniques (e.g., snap-to-grid, etc.). The newly arranged display elements (as shown in FIG. 2B) may be more convenient to the user (relative to the display elements of FIG. 2A). Consequently, the user may more effectively manage display elements in a three-dimensional desktop environment via the application 150.

In one embodiment, applying a positional effect with respect to a plane may move a display element away from the plane. For example, the positional effect with respect to the bottom plane 208 moves the display element 213 of FIG. 2A away from the bottom plane 208.

In one embodiment, the application 150 may also animate the display elements 154 as the application 150 moves the display elements to the new positions. The user may request to cease the positional effect at any point during the animation. In response, the application 150 may cease applying the positional effect to the display elements 154. Thus, the application 150 may move the display elements 154 only partially from original positions of the display elements 154 to the new positions. Consequently, the user may customize an extent to which the positional effect rearranges the display elements 154.

In one embodiment, the user may specify to not apply the positional effect to a given icon or window on the desktop display. Further, the user may also specify which pane to affix the display element. In response, the application 150 may affix the display element to the specified plane. For example, suppose that the user specifies to affix the display element 217 of FIG. 2A to the right plane 210. After the application 150 applies the positional effect, the display element 217 (as shown in FIG. 2B) remains affixed to the right plane 210 and is unaffected by the positional effect.

Figure 3:
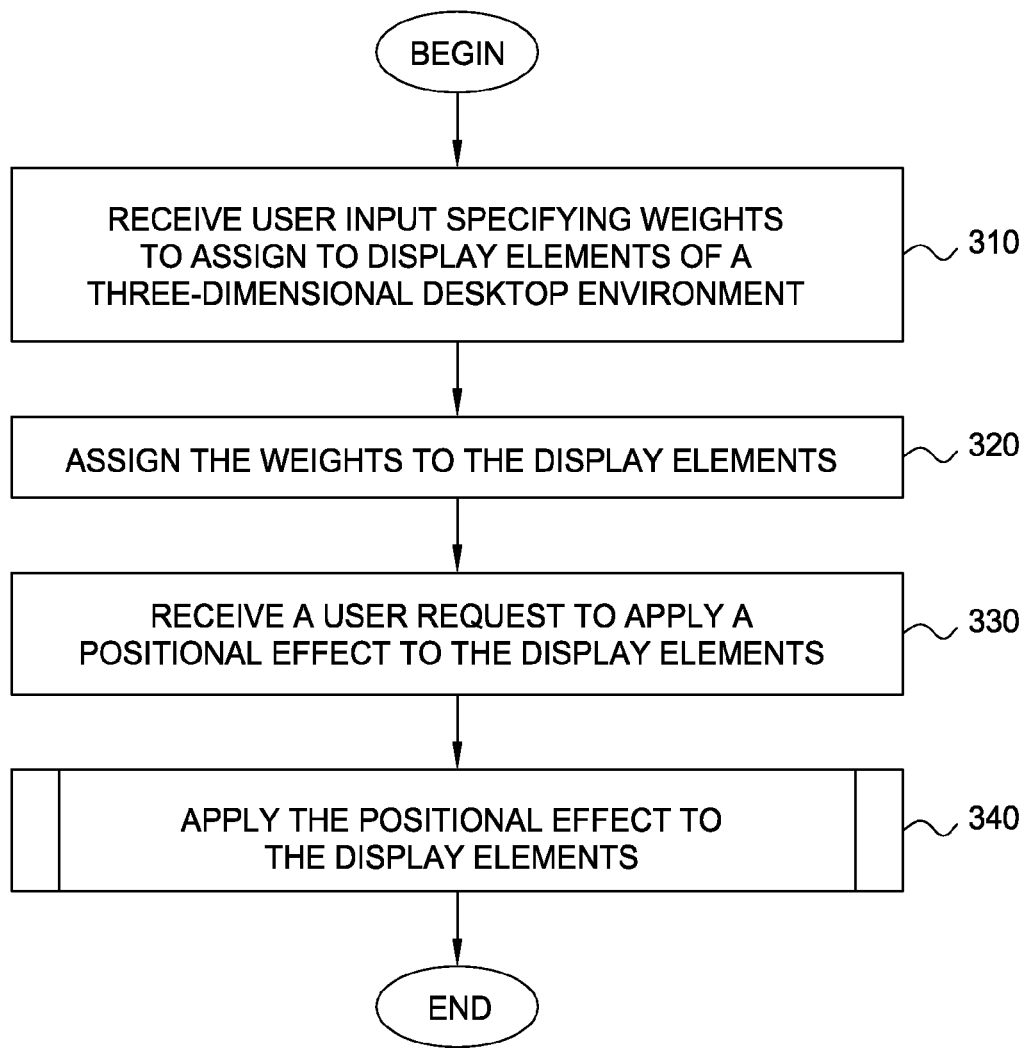
FIG. 3 is a flowchart depicting a method for arranging the display elements in the three-dimensional desktop environment, according to one embodiment of the invention.

FIG. 3 is a flowchart depicting a method 300 for arranging display elements in the desktop environment 152 of FIG. 1, according to one embodiment of the invention. As shown, the method 300 begins at step 310, where the application 150 receives user input specifying weights to assign to the display elements 154 of the three-dimensional desktop environment 152. In another embodiment, the system 100 may assign default values for the weights. At step 320, the application 150 assigns the weights 156 to the display elements 154. At step 330, the application 150 receives a user request to apply a positional effect to the display elements 154. In response, the application 150 applies the positional effect to the display elements 154 (step 340). After step 340, the method 300 terminates.

Figure 4:
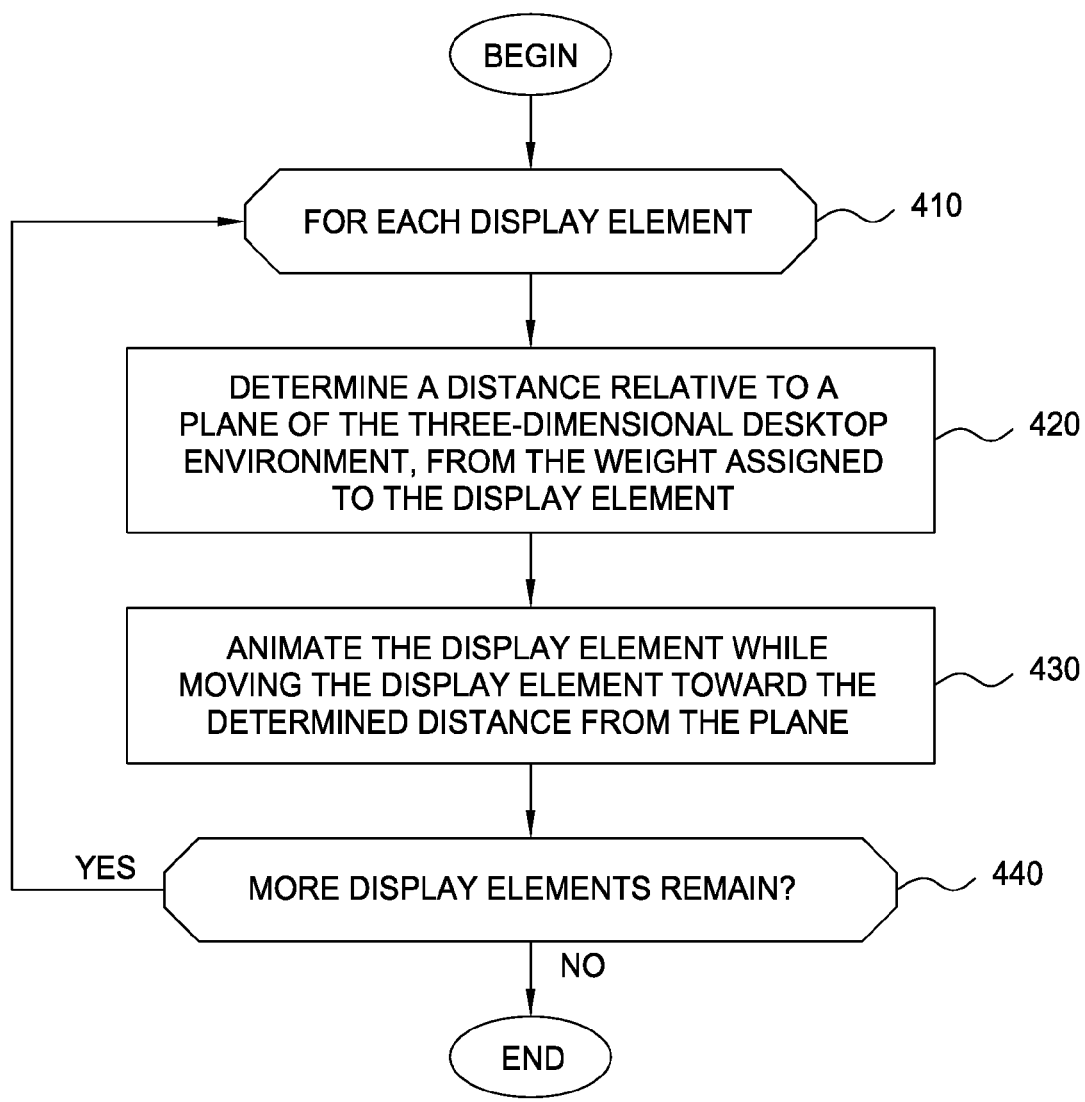
FIG. 4 is a flowchart depicting a method for applying the positional effect to the display elements of the three-dimensional desktop environment, according to one embodiment of the invention.

FIG. 4 is a flowchart depicting a method 400 for applying the positional effect to the display elements 154 of FIG. 1, according to one embodiment of the invention. The method 400 corresponds to the step 340 of FIG. 3. As shown, the method 400 begins at step 410, where a loop begins for each display element 154. In one embodiment, the application 150 may perform the steps 420 and/or 430 on multiple display elements at substantially the same time.

At the step 420, the application 150 determines a distance relative to a plane of the desktop environment 152 from the weight 156 assigned to the display element 154. For example, the application 150 may determine that a display element having a Light weight is to be positioned at a distance of 750 pixels from a specified plane (e.g., a bottom plane). At the step 430, the application 150 animates the display element by moving it (from an initial position of the display element in the desktop environment) toward a location (i.e., a final position) that is at the distance (from the plane) determined for that display element. At step 440, the application 150 determines whether more display elements remain. If so, the method 400 returns to the step 410 to apply the positional effect to a next display element.

Other embodiments are broadly contemplated without departing from the scope of the invention. For example, in one embodiment, the application 150 may move a display element to a new position at a speed determined from the weight (or a separate attribute) specified for the display element. In moving display elements to new positions, the application 150 may also group together display elements of the same (or similar) weight. The application 150 may also output a sound effect when a display element makes contact with a plane and/or with another display element. The application 150 may also apply multiple positional effects simultaneously (e.g., with respect to planes of distinct axes of the desktop environment) based on multiple weight attributes for each display element. The application 150 may also accept input from a second user specifying weights for a display element (e.g., in a desktop environment shared by the user and the second user). Of course, those skilled in the art will recognize that the way of applying a positional effect to arrange display elements of a three-dimensional desktop environment may be tailored to suit the needs of a particular case.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Advantageously, embodiments of the invention provide techniques for arranging display elements in a desktop environment. One embodiment of the invention provides a window manager application. In one embodiment, the application may receive user input specifying weights to assign to the display elements. The application may assign the weights to the display elements. The application may receive a user request to apply a positional effect to the display elements. The application 150 may apply the positional effect to the display elements, in response to the user request. The positional effect may arrange the display elements in a fashion more convenient to the user. Consequently, the user may more effectively manage display elements in a three-dimensional desktop environment.

While the foregoing is directed to embodiments of the present invention, other and further embodiments of the invention may be devised without departing from the basic scope thereof, and the scope thereof is determined by the claims that follow.

What is claimed is:

1. A computer-implemented method, comprising:
    configuring one or more computer processors to perform an operation for arranging a plurality of display elements in a three-dimensional desktop environment, comprising:
        receiving a user request to apply a positional effect to the plurality of display elements, wherein each display element of the plurality of display elements includes a respective gravitational attribute specifying how the respective display element behaves relative to a first plane in the three-dimensional desktop environment, and wherein each display element of the plurality of display elements is disposed at an initial position in the three-dimensional desktop environment;
        receiving user input specifying: (i) a value for the gravitational attribute of each of the plurality of display elements, (ii) the first plane, (iii) one or more of the plurality of display elements for which the positional effect is not to be applied, and (iv) a second plane in the three-dimensional desktop environment to which the specified one or more display elements are to be affixed;
        affixing the specified one or more display element to the second plane responsive to the received user input specifying the second plane; and
        in response to the received user request, applying the positional effect to the remaining plurality of display elements not specified to be affixed to the second plane by:
            determining, for each of the remaining plurality of display elements, a final position based on the respective gravitational attribute, wherein the final position for one or more of the display elements is disposed at a distance from the first plane, and wherein the distance is determined from the gravitational attribute of the respective display element; and
            rendering an animation of each of the remaining plurality of display elements moving from the respective initial position to the respective final position.

2. The computer-implemented method of claim 1, wherein the operation further comprises:
    setting the value of the gravitational attribute of each of the plurality of display elements based on the received user input.

3. The computer-implemented method of claim 1, wherein the specified display element remains affixed to the specified second plane when the positional effect is applied.

4. The computer-implemented method of claim 1, wherein the distance is measured in terms of a count of pixels.

5. The computer-implemented method of claim 1 wherein each display element represents one of a file, a folder, a shortcut, and an executing application, wherein the plurality of display elements includes the file, the folder, the shortcut, and the executing application, wherein the positional effect is applied to the plurality of display elements against the first plane.

6. The computer-implemented method of claim 5, wherein the plurality of display elements does not include the specified one or more display elements, wherein the positional effect is applied such that each of the plurality of display elements moves from the respective initial position to the respective final position at a respective rate of speed, wherein the rate of speed and the final position of a first display element of the plurality of display elements is determined by the gravitational attribute of the first display element.

7. The computer-implemented method of claim 1, wherein the positional effect is applied by a predefined application comprising a three-dimensional window manager configured to apply the positional effect when: (i) the first plane and the second plane refer to the same plane, and (ii) the first plane and the second plane refer to different planes.

8. A computer-readable storage medium containing a program, which, when executed on a processor, performs an operation for arranging a plurality of display elements in a three-dimensional desktop environment, wherein the operation comprises:
    receiving a user request to apply a positional effect to the plurality of display elements, wherein each display element of the plurality of display elements includes a respective gravitational attribute specifying how the respective display element behaves relative to a first plane in the three-dimensional desktop environment, and wherein each display element of the plurality of display elements is disposed at an initial position in the three-dimensional desktop environment;
    receiving user input specifying: (i) a value for the gravitational attribute of each of the plurality of display elements, (ii) the first plane, (iii) one or more of the plurality of display elements for which the positional effect is not to be applied, and (iv) a second plane in the three-dimensional desktop environment to which the specified one or more display elements are to be affixed;
    affixing the specified one or more display element to the second plane responsive to the received user input specifying the second plane; and
    in response to the received user request, applying the positional effect to the remaining plurality of display elements not specified to be affixed to the second plane by:
        determining, for each of the remaining plurality of display elements, a final position based on the respective gravitational attribute, wherein the final position for one or more of the display elements is disposed at a distance from the first plane, and wherein the distance is determined from the gravitational attribute of the respective display element; and
        rendering an animation of each of the remaining plurality of display elements moving from the respective initial position to the respective final position.

9. The computer-readable storage medium of claim 8, wherein the operation further comprises:
    setting the value of the gravitational attribute of each of the plurality of display elements based on the received user input.

10. The computer-readable storage medium of claim 8, wherein
    the specified display element remains affixed to the specified second plane when the positional effect is applied.

11. The computer-readable storage medium of claim 8, wherein the distance is measured in terms of a count of pixels, wherein each display element represents one of a file, a folder, a shortcut, and an executing application, wherein the plurality of display elements includes the file, the folder, the shortcut, and the executing application, wherein the positional effect is applied to the plurality of display elements against the first plane.

12. The computer-readable storage medium of claim 11, wherein the plurality of display elements does not include the specified one or more display elements, wherein the positional effect is applied such that each of the plurality of display elements moves from the respective initial position to the respective final position at a respective rate of speed, wherein the rate of speed and the final position of a first display element of the plurality of display elements is determined by the gravitational attribute of the first display element.

13. The computer-readable storage medium of claim 12, wherein the positional effect is applied by a predefined application comprising a three-dimensional window manager configured to apply the positional effect when: (i) the first plane and the second plane refer to the same plane, and (ii) the first plane and the second plane refer to different planes.

14. A system, comprising:
   one or more computer processors; and
   a memory containing a program, which when executed by the one or more computer processors is configured to perform an operation for arranging a plurality of display elements in a three-dimensional desktop environment, the operation comprising:
      receiving a user request to apply a positional effect to the plurality of display elements, wherein each display element of the plurality of display elements includes a respective gravitational attribute specifying how the respective display element behaves relative to a first plane in the three-dimensional desktop environment, and wherein each display element of the plurality of display elements is disposed at an initial position in the three-dimensional desktop environment;
      receiving user input specifying: (i) a value for the gravitational attribute of each of the plurality of display elements, (ii) the first plane, (iii) one or more of the plurality of display elements for which the positional effect is not to be applied, and (iv) a second plane in the three-dimensional desktop environment to which the specified one or more display elements are to be affixed;
      affixing the specified one or more display element to the second plane responsive to the received user input specifying the second plane; and
      in response to the received user request, applying the positional effect to the remaining plurality of display elements not specified to be affixed to the second plane by:
         determining, for each of the remaining plurality of display elements, a final position based on the respective gravitational attribute, wherein the final position for one or more of the display elements is disposed at a distance from the first plane, and wherein the distance is determined from the gravitational attribute of the respective display element; and
         rendering an animation of each of the remaining plurality of display elements moving from the respective initial position to the respective final position.

15. The system of claim 14, wherein the operation further comprises:
   setting the value of the gravitational attribute of each of the plurality of display elements based on the received user input.

16. The system of claim 14, wherein
   the specified display element remains affixed to the specified second plane when the positional effect is applied.

17. The system of claim 14, wherein the distance is measured in terms of a count of pixels, wherein each display element represents one of a file, a folder, a shortcut, and an executing application, wherein the plurality of display elements includes the file, the folder, the shortcut, and the executing application, wherein the positional effect is applied to the plurality of display elements against the first plane.

18. The system of claim 17, wherein the plurality of display elements does not include the specified one or more display elements, wherein the positional effect is applied such that each of the plurality of display elements moves from the respective initial position to the respective final position at a respective rate of speed, wherein the rate of speed and the final position of a first display element of the plurality of display elements is determined by the gravitational attribute of the first display element.

19. The system of claim 18, wherein the positional effect is applied by a predefined application comprising a three-dimensional window manager configured to apply the positional effect when: (i) the first plane and the second plane refer to the same plane, and (ii) the first plane and the second plane refer to different planes.

* * * * *